US010752150B2

(12) United States Patent
Johnson

(10) Patent No.: US 10,752,150 B2
(45) Date of Patent: Aug. 25, 2020

(54) MODULAR OFFSET MOUNTING APPARATUS

(71) Applicant: Corey B. Johnson, Hyrum, UT (US)

(72) Inventor: Corey B. Johnson, Hyrum, UT (US)

( * ) Notice: Subject to any disclaimer, the term of this patent is extended or adjusted under 35 U.S.C. 154(b) by 202 days.

(21) Appl. No.: 15/982,721

(22) Filed: May 17, 2018

(65) Prior Publication Data
US 2018/0264985 A1 Sep. 20, 2018

Related U.S. Application Data

(63) Continuation-in-part of application No. 15/598,250, filed on May 17, 2017.

(60) Provisional application No. 62/508,761, filed on May 19, 2017, provisional application No. 62/508,779, filed on May 19, 2017.

(51) Int. Cl.
| | |
|---|---|
| *B60P 7/08* | (2006.01) |
| *B60P 3/077* | (2006.01) |
| *B62D 33/02* | (2006.01) |
| *B60P 3/073* | (2006.01) |
| *B60P 3/075* | (2006.01) |
| *B60P 3/06* | (2006.01) |
| *B60P 3/07* | (2006.01) |
| *B65D 90/00* | (2006.01) |

(Continued)

(52) U.S. Cl.
CPC .................. *B60P 3/077* (2013.01); *B60P 3/06* (2013.01); *B60P 3/07* (2013.01); *B60P 3/073* (2013.01); *B60P 3/075* (2013.01); *B60P 7/0815* (2013.01); *B60P 7/0892* (2013.01); *B60R 9/08* (2013.01); *B62D 33/02* (2013.01); *B62D 33/0207* (2013.01); *B65D 88/12* (2013.01); *B65D 90/004* (2013.01); *B65D 90/006* (2013.01); *B65D 90/0053* (2013.01)

(58) Field of Classification Search
CPC ........... B60P 3/077; B60P 3/073; B60P 3/075; B60P 7/0892; B60P 3/06; B60P 3/07; B60P 7/0815; B65D 90/004; B65D 90/0053; B65D 88/12; B65D 90/006; B60R 9/08; B62D 33/02; B62D 33/0207
USPC ...... 410/6–12, 104–106, 110, 113, 115, 126, 410/150, 121
See application file for complete search history.

(56) References Cited

U.S. PATENT DOCUMENTS

| | | | | |
|---|---|---|---|---|
| 5,516,245 | A | * | 5/1996 | Cassidy .................... B60P 7/15 410/101 |
| 5,807,047 | A | * | 9/1998 | Cox .......................... B60P 7/15 410/143 |

(Continued)

*Primary Examiner* — Stephen T Gordon
(74) *Attorney, Agent, or Firm* — Michael R. Schramm

(57) ABSTRACT

The present invention is modular offset mounting apparatus for use in efficiently and densely removeably mounting objects comprising a structure having a plurality of spring E-fittings on a first side and an E-track section on a second side. The modular offset mounting apparatus is adapted such that the spring E-fittings of the modular offset mounting apparatus may be removeably engaged to a section of E-track that is fastened to a structure such as a truck bed and such that at least one spring E-fitting such as a spring E-fitting connected to a wheel chock is removeably engaged to the length of E-track of the modular offset mounting apparatus. By so mounting the modular offset mounting apparatus, objects such as motorcycles may be more densely positioned and mounted such as in a bed of a pickup truck.

14 Claims, 3 Drawing Sheets

(51) Int. Cl.
*B65D 88/12* (2006.01)
*B60R 9/08* (2006.01)

(56) References Cited

U.S. PATENT DOCUMENTS

| | | | |
|---|---|---|---|
| 5,971,685 A | 10/1999 | Owens | 410/151 |
| 6,364,141 B1 * | 4/2002 | Ehrgott | A47F 5/0823 |
| | | | 211/103 |
| 6,675,980 B2 | 1/2004 | Ehrgott | 211/189 |
| 6,729,485 B2 | 5/2004 | Ehrgott | 211/189 |
| 8,028,845 B2 | 10/2011 | Himes | 211/103 |
| 8,439,612 B2 | 5/2013 | Chamoun | 410/121 |
| 8,690,503 B2 | 4/2014 | Chamoun | 410/121 |
| 8,985,922 B2 * | 3/2015 | Neumann | B60P 7/0807 |
| | | | 410/106 |
| 9,346,392 B1 | 5/2016 | Neal et al. | B60P 7/0815 |
| 2002/0117464 A1 | 8/2002 | Ehrgott | 211/189 |
| 2002/0117465 A1 | 8/2002 | Ehrgott | 211/189 |
| 2008/0185489 A1 | 8/2008 | Ehrgott | 248/224.7 |
| 2009/0120888 A1 | 5/2009 | Himes | 211/103 |
| 2012/0257943 A1 | 10/2012 | Chamoun | 410/122 |
| 2014/0360957 A1 | 12/2014 | Himes | B60P 7/0815 |
| 2016/0167717 A1 | 6/2016 | Marchlewski et al. | B62D 33/0207 |
| 2016/0207441 A1 | 7/2016 | Khan | B60P 7/15 |

* cited by examiner

MODULAR OFFSET MOUNTING APPARATUS

CROSS REFERENCE TO RELATED APPLICATIONS

This US nonprovisional utility patent application is a continuation-in-part of and claims the benefit under 35 USC § 120 to U.S. application Ser. No. 15/598,250 filed May 17, 2017 and claims the benefit under 35 USC § 119(e) of U.S. provisional applications Nos. 62/508,761 and 62/508,779 both filed May 19, 2017, all of which are expressly incorporated herein in their entirety by this reference.

FIELD OF THE INVENTION

The present invention relates to mounting apparatuses, and in particular, to mounting apparatuses for use in offset mounting so as to increase mounting density and efficiency, especially in truck beds.

BACKGROUND OF THE INVENTION

Various means are known in the art for releasably mounting and securing objects especially in truck beds. However, such means have typically been awkward and cumbersome to mount and to release and/or do not allow for efficient use of space such as in a truck bed. Examples of various mounting systems are disclosed in the following list of U.S. patents and applications, all of which are expressly incorporated herein by reference: U.S. Pat. No. 5,971,685 to Owens, U.S. Pat. No. 6,675,980 to Ehrgott, U.S. Pat. No. 6,729,485 to Ehrgott, U.S. Pat. No. 8,028,845 to Himes, U.S. Pat. No. 8,439,612 to Chamoun, U.S. Pat. No. 8,690,503 to Chamoun, U.S. Pat. No. 9,346,392 to Neal, 20020117464 to Ehrgott, 20020117465 to Ehrgott, 20080185489 to Ehrgott, 20090120888 to Himes, 20120257943 to Chamoun, 20140360957 to Himes, 20160167717 to Marchlewski, and 20160207441 to Khan. Further, it is known to provide E-Track (see Appx A) and various spring E-fittings such as a spring E-fitting having a swivel ring (E-Track ring) (see Appx B). E-Track and various E-fittings are commercially available from a variety of sources such as Harbor Freight Tools.

SUMMARY OF THE INVENTION

The present invention is modular offset mounting apparatus for use in efficiently and densely removeably mounting objects comprising a structure having a plurality of spring E-fittings on a first side and an E-track section on a second side. The modular offset mounting apparatus is adapted such that the spring E-fittings of the modular offset mounting apparatus may be removeably engaged to a section of E-track that is fastened to a structure such as a truck bed and such that at least one spring E-fitting such as the spring E-fittings of a wheel chock as disclosed in Ser. No. 15/598,250, is removeably engaged to the section of E-track of the modular offset mounting apparatus. By so mounting the modular offset mounting apparatus, objects such as motorcycles may be more densely positioned and mounted such as in a bed of a pickup truck.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

FEATURE TABLE

| # | Feature | # | Feature |
|---|---|---|---|
| 10 | Modular offset mounting apparatus | 20 | E-track |
| 22 | E-track upper flange | 24 | E-track lower flange |
| 26 | E-track mount interface surface | 30 | Rhomboidal tube |
| 40 | Spring E-fitting device | 42 | Plate |
| 44 | Spring E-fitting | 46 | Weld bead |
| 50 | Fasteners | | |

Figure 1:
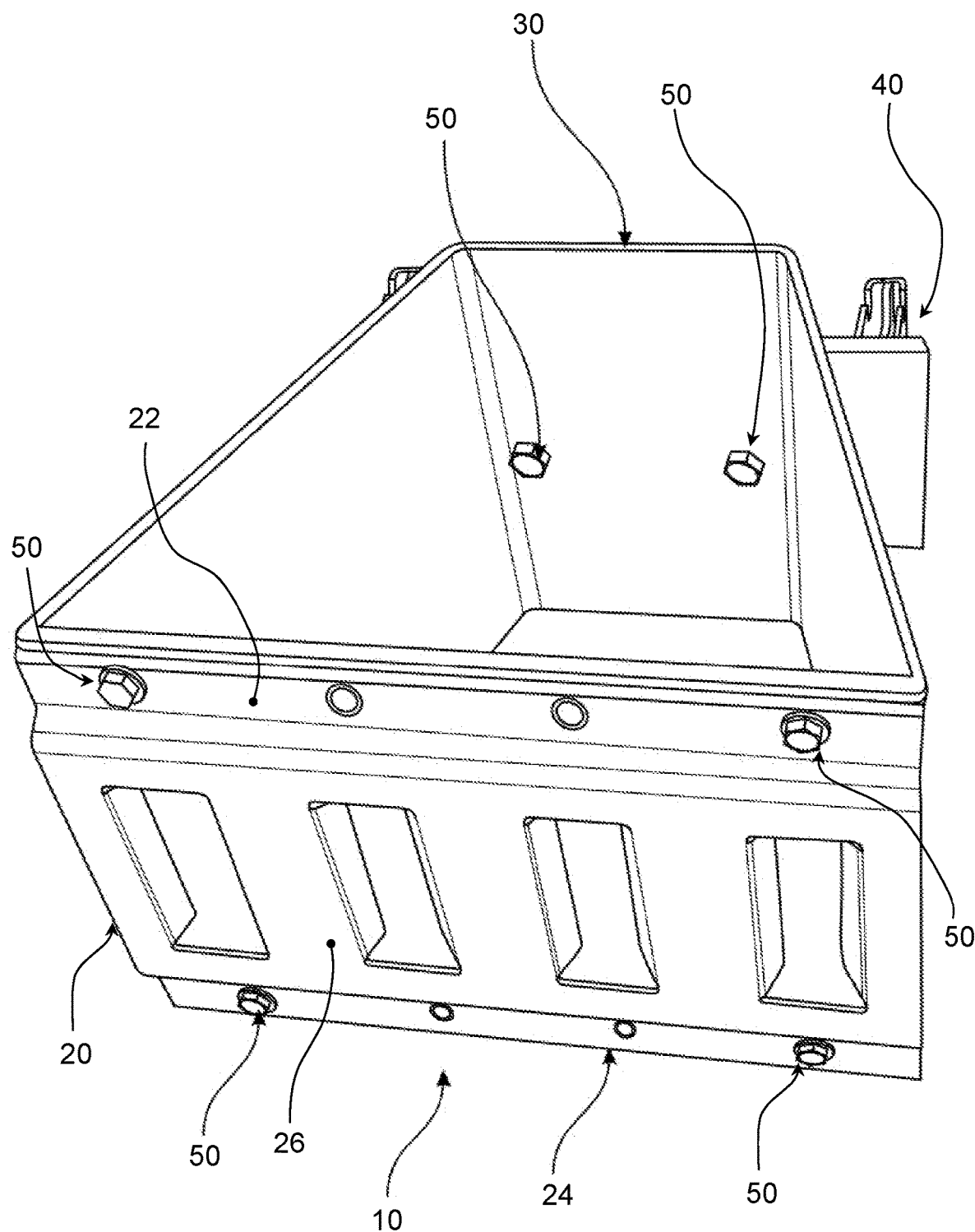
FIG. 1 is a trimetric view of the apparatus showing the E-track section side of the apparatus.
Figure 2:
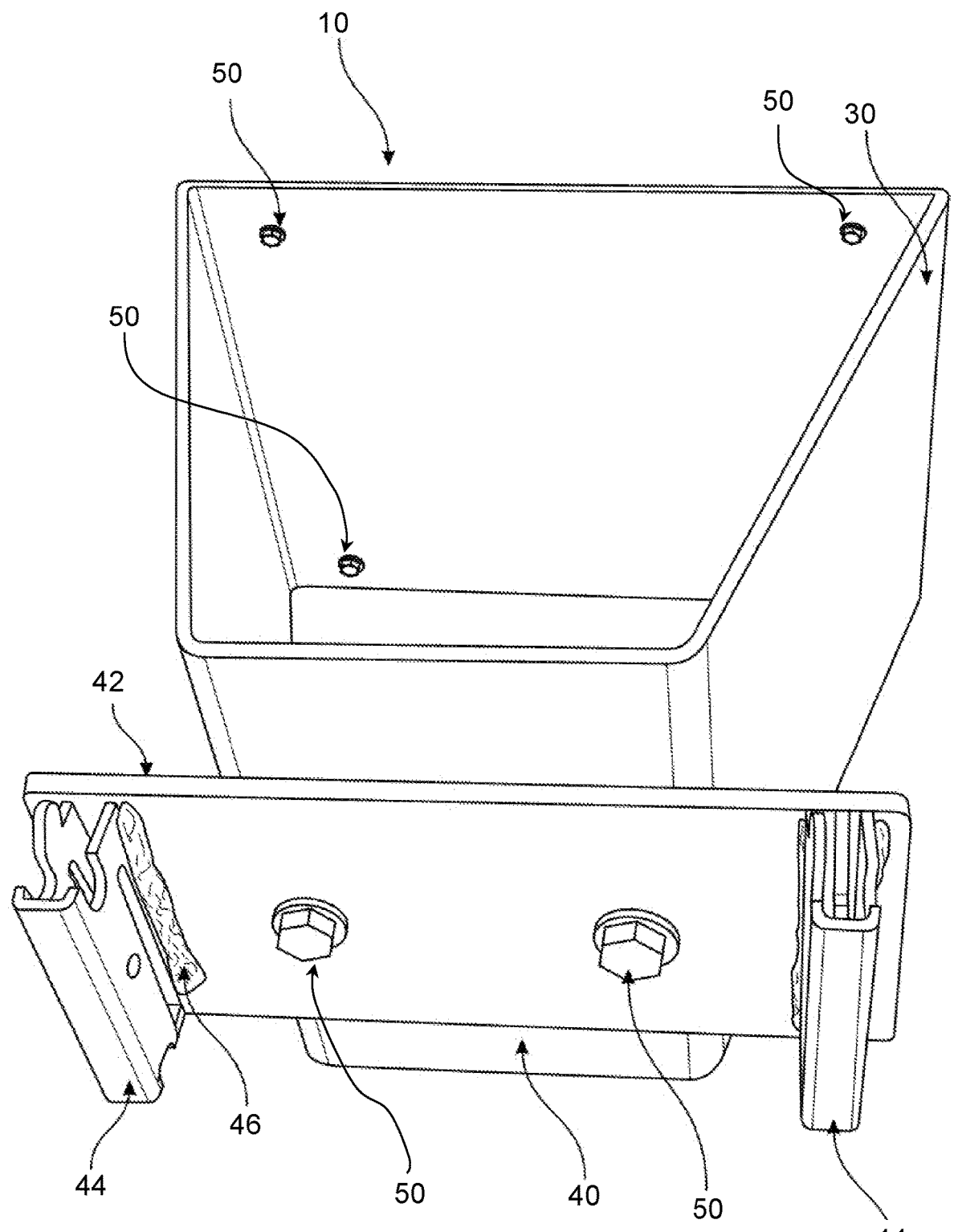
FIG. 2 is a reverse trimetric view of the apparatus showing the spring E-fitting device side of the apparatus.
Figure 3:
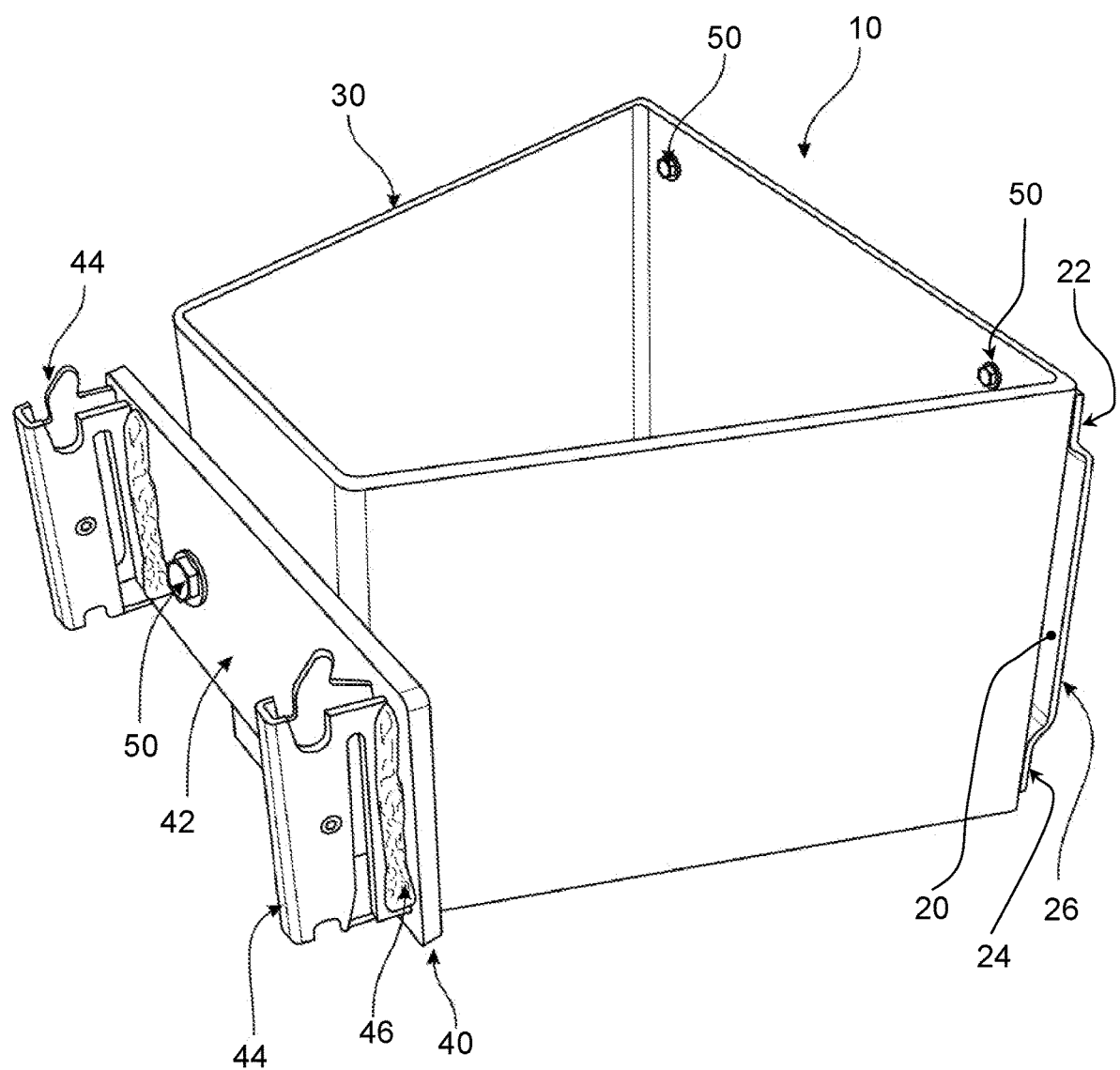
FIG. 3 is a rotated trimetric view of the apparatus showing the spring E-fitting device side of the apparatus.

Referring now to the drawings, a first embodiment the invention is a modular offset mounting apparatus 10 comprising a length of E-track 20 having an upper flange 22, a lower flange 24, and a mount interface surface 26, a trapezoidal tube 30 (as shown in FIGS. 1-3) or a rhomboidal tube 30, a spring E-fitting device 40, and a plurality of fasteners 50. Rhomboidal tube 30 further defines a hollow preferably metal tube having a substantially rhomboidal shaped cross-section of approximately eight inches wide by eight inches long but may be more or less than such dimensions. E-track 20 further defines a piece of E-track of approximately eight inches in length but may be longer or shorter than eight inches. Spring E-fitting device 40 further defines a preferably metal plate 42 and a plurality of spring E-fittings 44 welded thereto via weld beads 46 at predetermined distances from each other preferably corresponding to a pitch (of receiving slots) of E-track 20. Modular offset mounting apparatus 10 is assembled such that the E-track 20 is fastened to a first side of rhomboidal tube 30, and spring E-fitting device 40 is fastened to a second side of rhomboidal tube 30 which is the opposite side of the first side of rhomboidal tube 30.

In practice, modular offset mounting apparatus 10 is spring loadingly and removably engaged to a piece of E-track that is fastened to a structure such as a truck bed by engaging spring E-fittings 44 of spring E-fitting device 40 into the slots of the piece of E-track that is fastened to a structure such as a truck bed. Further, at least one spring E-fitting such as the spring E-fittings of a wheel chock as disclosed in Ser. No. 15/598,250, is removeably engaged to E-track 20 of modular offset mounting apparatus 10 by engaging the spring E-fittings such as the spring E-fittings of a wheel chock device into the slots of E-track 20 of modular offset mounting apparatus 10. With modular offset mounting apparatus 10 thus mounted and a further device mounted thereto, objects may be mounted to modular offset mounting apparatus 10 in a closer or more dense mounting arrangement than could otherwise be mounted without use of modular offset mounting apparatus 10. For instance, if motorcycles are mounted side-by-side in a substantially coplanar (non-staggered) arrangement (i.e. without the use of modular offset mounting apparatus 10), the spacing between the mounted motorcycles is larger being limited by the width of the motorcycle handlebars. However, if modular offset mounting apparatus 10 is used for alternating motorcycle mounts in a staggered fashion (i.e. a first motorcycle is mounted using modular offset mounting apparatus 10 and the motorcycles immediately next to the first motorcycle do not), the motorcycles may be nested or mounted closer to each other without handlebar width necessarily being a limiting factor to motorcycle proximity relative to each other.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modular offset mounting apparatus comprising a base structure, a length of E-track, and at least one spring E-fitting, wherein said E-track is connected to a first side of said base structure and said at least one spring E-fitting is connected to a second side of said base structure, and wherein a spring E-fitting component is spring loadingly and removably engaged to said E-track, and wherein said spring E-fitting component defines at least one of a spring E-fitting welded to a motorcycle chock and a spring E-fitting welded to an E-Track ring.

2. The apparatus of claim 1, wherein said second side of said base structure is substantially parallel to and offset a predetermined distance from said first side of said base structure.

3. The apparatus of claim 1, wherein said at least one spring E-fitting device is fastened to said base structure, said spring E-fitting device defining a plate having a plurality of spring E-fittings welded thereto.

4. The apparatus of claim 1, wherein said at least one spring E-fitting is spring loadingly and removably engaged to a piece of E-track that is connected to a second structure.

5. The apparatus of claim 4, wherein said second structure defines at least one of a truck bed wall, a cargo box wall, and a trailer wall.

6. A modular offset mounting apparatus comprising a substantially hollow tubular base structure having a substantially trapezoidal shaped cross-section, a length of E-track, at least one spring E-fitting, and a plurality of fasteners, wherein said length E-track is fastened to a first side of said base structure, and said at least one spring E-fitting is fastened to a second side of said base structure, and wherein a spring E-fitting component is spring loadingly and removably engaged to said E-track, and wherein said spring E-fitting component defines at least one of a spring E-fitting welded to a motorcycle chock and a spring E-fitting welded to an E-Track ring.

7. The apparatus of claim 6, wherein said second side of said base structure is substantially parallel to and offset a predetermined distance from said first side of said base structure.

8. The apparatus of claim 6, wherein said spring E-fitting device is fastened to said base structure, said at least one spring E-fitting defining a plate having a plurality of spring E-fittings welded thereto.

9. The apparatus of claim 6, wherein said at least one spring E-fitting is spring loadingly and removably engaged to a piece of E-track that is connected to a second structure.

10. The apparatus of claim 9, wherein said second structure defines at least one of a truck bed wall, a cargo box wall, and a trailer wall.

11. A modular offset mounting apparatus comprising a base structure, a length of E-track, and at least one spring E-fitting, wherein said E-track is welded to a first side of said base structure and said at least one spring E-fitting is welded to a second side of said base structure, and wherein a spring E-fitting device is spring loadingly and removably engaged to said E-track, and wherein said spring E-fitting device defines at least one of a spring E-fitting welded to a motorcycle chock and a spring E-fitting welded to an E-Track ring.

12. The apparatus of claim 11, wherein said second side of said base structure is substantially parallel to and offset a predetermined distance from said first side of said base structure.

13. The apparatus of claim 11, wherein said at least one spring E-fitting is spring loadingly and removably engaged to a piece of E-track that is connected to a second structure.

14. The apparatus of claim 13, wherein said second structure defines at least one of a truck bed wall, a cargo box wall, and a trailer wall.

* * * * *